United States Patent Office 3,137,717
Patented June 16, 1964

3,137,717
METAL ACID SALTS OF POLYBASIC ORGANIC ACIDS
Kurt Peters, Getreidemarkt 9, Vienna, Austria
No Drawing. Filed May 31, 1957, Ser. No. 662,562
Claims priority, application Austria June 2, 1956
1 Claim. (Cl. 260—448)

The invention relates to a process for preparing complex compounds. More particularly it relates to the preparation of such complexes as are suitable for the separation, in the ideal (substantially) homogeneous medium, of chemically closely related elements.

It is known that aluminium oxalate solutions have a more or less pronounced complex character. The preparation of stable and crystallized acid aluminium oxalates from aqueous medium has hitherto not been successful (see A. Rosenheim, L. Cohn [Z. anorg. Ch. 11 [1896], 178 et seq.]).

It has now been found that, if certain working conditions are observed, it is possible to obtain complex compounds of aluminium and similar metals with organic acids from aqueous solution as stable and usually well defined crystallised compounds.

According to the invention there is provided a process for the preparation of complex compounds of metals which comprises treating an oxidic compound comprising an oxide, hydroxide or an oxide hydrate or a compound capable of conversion into the oxidic compound of the metal (cation former) to be incorporated into the complex with an organic acid which will form a complex in a time consuming reaction (i.e. very slowly) until at least one of both reactants serving in the complex formation is consumed, allowing the complex formation to reach completion, separating any excess reactants and, if desired, isolating the matured complex compounds.

The process of the present invention can also be carried out in such manner that after consumption of one of both reactants a further amount of the consumed reactant is added for reaction with the still existent amount of the other reactant thus allowing the complex formation to proceed very slowly until completion of complex formation is reached.

According to a preferred embodiment of the invention complex formation is continued until the reaction mixture is converted to a highly viscous mass.

It is also advantageous to ascertain completion of the complex formation by continuation of the treatment until neither the metal cation nor free acid can be detected by normal analytical methods.

The metals, complexes of which may be obtained by this process include e.g. aluminium, zirconium, hafnium, niobium, tantalum, chrominum, molybdenum, tungsten and uranium. The preferred metal is aluminium and, for the sake of convenience, the invention is described with principal reference to this metal, but is in no manner limited to said metal.

The organic acids which may be used include, e.g. oxalic acid, citric acid and tartaric acid. In the case of aluminium, the tartaric acid complex is the hardest to obtain but the complexes of all three acids can be obtained as definite compounds in the crystal form. These three complexes are suitable as solvents for rare earths and other difficulty separable elements.

The active oxidic compounds of the metal may be e.g. the active hydroxide.

In carrying out the process of the present invention aluminium hydroxide is preferably used as starting material. In order to obtain complex aluminium oxalic acid, aluminium tartaric acid or aluminium citric acid, the aluminium hydroxide is treated with the appropriate acid until neither free aluminium nor free acid can be detected by normal analytical methods, e.g. with ammonia, without destroying the complex. Aloxalic acid readily crystallises from this solution.

Since the method of the present invention, as already pointed out, takes a considerable time to reach completion, a much longer time must be used for maturing the complexes than hitherto usual for chemical reaction. For example, approximately two weeks are necessary to prepare a matured aluminium oxalic acid complex.

To shorten the overall time of treatment one may first neutralise the main quantities of organic acid by digesting with industrial aluminium oxide hydrates and then using active or freshly precipitated aluminium hydroxide only for the complex binding of the remainder of free acid.

There is also the possibility of starting from aluminium slats of volatile acids, such as aluminium nitrate, and digesting with organic acids until the volatile inorganic acid has been considerably vaporised. A final neutralisation with active alumina is also suitable in these cases. However, the excess acid can also be separated by fractional crystallisation. In this manner the aluminium oxalic acid is obtained very easily and well crystallised as cauliflower-like growths. These crystals give a sharp extremely rectilinear X-ray diagram which leads one to conclude that it has a very highly molecular complex structure.

The process of the invention may be illustrated by, but is in no manner limited to the following examples.

*Example 1*

Freshly precipitated active alumina is obtained by mixing 20% aluminium chloride solution with 10% ammonium hydroxide solution at a temperature of about 40° C. until neutralisation, filtered and washed. The moist filter cake is made into the form of a slurry with distilled water and can, if necessary, be stored in this form. This slurry is used as active aluminium hydroxide gel suspension for the preparation of the complex compounds of the present invention with aluminium as cation former.

To obtain aluminium oxalic acid, 100 g. of such a suspension, calculated on the dry weight, are mixed with 1,000 cc. of 10% oxalic acid solution on the water bath (about 60° to 80° C.) and stirred. After one day, it is allowed to settle and, according to the quantity of the still undissolved alumina, more 10% oxalic acid solution added with continued heating on the water bath and stirring. This second operation takes about 3 to 4 days, until a honey-like mass has formed. It is tested for free oxalic acid with, for example, potassium permanganate and, if necessary, the maturing process on the water bath is continued for another two days. When no free oxalic acid is present, the mixture is diluted with water to about twice the volume and allowed to stand for one day at room temperature, the excess alumina then being filtered off. The filtrate is then concentrated on the water bath to a density of at least 1.2, when it is allowed to crystallise at room temperature. A pure white crystal mass of cauliflower-like growths is produced. Analysis of this product gives the following composition:

| | Percent |
|---|---|
| Aluminium | 10.26 |
| Oxalic acid | 52.00 |
| Water | 40.74 |

This corresponds to a formula:

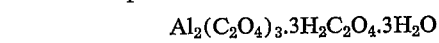

or

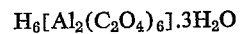

and thus defines a new complex compound of the aluminium oxalate type.

In a similar manner well defined crystallised aluminium citric acid and aluminium tartaric acid complexes may be prepared, comparatively concentrated aqueous solutions of citric acid or tartaric acid being used as starting material, in which, at the temperature of the water bath, active aluminium hydroxide is introduced in portions until complete saturation, then the excess aluminium hydroxide is filtered off and the solution concentrated to the consistency of syrup.

*Example 2*

1 litre of 1-molar aluminium nitrate solution is treated on the water bath (about 60° to 80° C.) with 6 litres of 1-molar oxalic acid solution, as described in Example 1. After three days the solution is tested for free oxalic acid and if none is present, another quantity of approximately 200 cc. 1-molar oxalic acid added and the solution further treated carefully upon the water bath at a lower temperature than usual, until the development of nitrous gases ceases. The excess oxalic acid is then crystallised out at room temperature, filtered off and the filtrate concentrated in the course of approximately 1 week on the water bath until a density of at least 1.2 is achieved. The crystallised aloxalic acid is then separated as in Example 1.

*Example 3*

1 kg. of uranyl hydroxide is introduced into an aqueous solution containing 600 g. of solid crystallised oxalic acid and digested for a comparatively long time at the temperature of the water bath (about 60° to 80° C.). The speed of dissolution will depend on whether the uranyl hydroxide is present in a freshly precipitated form or as aged hydroxide gel; in any case, however, it must be digested for at least two days. Excess uranyl hydroxide is then filtered off and the nearly colourless filtrate further treated on the water bath again for about 2 to 3 days and stirred until the mass is of a honey-like consistency. This mass is then diluted with twice its volume of water and further treated on the water bath again until a thin crystal layer is formed on the surface of the liquid. It is crystallised out at room temperature, when white needles of uranium (VI)-oxalic acid are obtained. This substance is a well defined new complex compound having the formula $H_4[UO_2(C_2O_4)_3].3H_2O$. It is an extremely stable complex compound which can be decomposed only with e.g. strong mineral acids.

To obtain complex uranium (VI)-oxalic acid it is possible to work with excess oxalic acid as in Example 2, whereby the process may be somewhat accelerated. The excess oxalic acid must be separated again by fractional crystallisation.

Similarly to the preparation of complex uranium oxalic acid it is possible, starting from niobium hydroxide or tantalum hydroxide, to obtain crystallised complexes of niobium (V)-oxalic acids and tantalum (V)-oxalic acids. There could be isolated inter alia well defined new substances of the formulae:

$H_5[Nb(C_2O_4)_5].nH_2O$ $H_7[Nb(C_2O_4)_6].nH_2O$
$H_5[Ta(C_2O_4)_5].nH_2O$ $H_7[Ta(C_2O_4)_6].nH_2O$ $n$ being here 3, 4 or 5 and their respective potassium salts, e.g. $K_5[Nb(C_2O_4)_5].4H_2O$.

Of the crystallised complexes obtained according to the same method with the other complex-forming metals, the crystallised complexes of, for example, chromium, molybdenum, tungsten, beryllium, germanium and iron oxalic acid have the following compositions, thus defining also new complex compounds of the type referred to:

$$H_6[Cr_2(C_2O_4)_6].nH_2O$$

and its barium salt $$Ba_3[Cr_2(C_2O_4)_6].4H_2O$$
$$H_2[Mo_2(C_2O_4)].nH_2O$$
$$H_2[W_2(C_2O_4)].nH_2O$$
$$H_2[Be_2(C_2O_4)_3].nH_2O$$

and its potassium salt $$K_2[Be_2(C_2O_4)_3].4H_2O$$
$$H_2[Ge(C_2O_4)_3].nH_2O$$
$$H_3[Fe(C_2O_4)_3].nH_2O$$

Complex compounds containing other di- or poly-basic organic acids such as citric or tartaric acid with the other cation formers mentioned besides aluminium may be prepared in a similar manner.

This application is a continuation-in-part of U.S. patent application Serial No. 654,445, filed April 23, 1957, now U.S. Patent No. 2,943,101.

What is claimed is:

As a new compound the aluminium-oxalic acid complex of the formula $H_6[Al_2(C_2O_4)_6].3H_2O$.

References Cited in the file of this patent

UNITED STATES PATENTS

| | | |
|---|---|---|
| 1,447,501 | Altwegg | Mar. 6, 1923 |
| 2,042,019 | Pastenack | May 26, 1936 |
| 2,275,211 | Urbain | Mar. 3, 1942 |
| 2,316,141 | Wainer | Apr. 6, 1943 |
| 2,327,815 | Niedercorn et al. | Aug. 24, 1943 |
| 2,872,467 | Duffield | Feb. 3, 1959 |

OTHER REFERENCES

Mellor: Comprehensive Treatise on Inorganic and Theoretical Chemistry, Longmans, 1924, volume 7, pages 130, 169; volume 9, pages 861, 899; volume 11, pages 235, 236, 759; volume 12, pages 40, 49; volume 13, pages 717, 759, 814, 873.

Seaborg and Katz: "The Actinide Elements," McGraw-Hill, 1954, pages 159 and 160.